(No Model.)
G. L. ALLEN.
FURNACE GRATE.
No. 409,657. Patented Aug. 27, 1889.
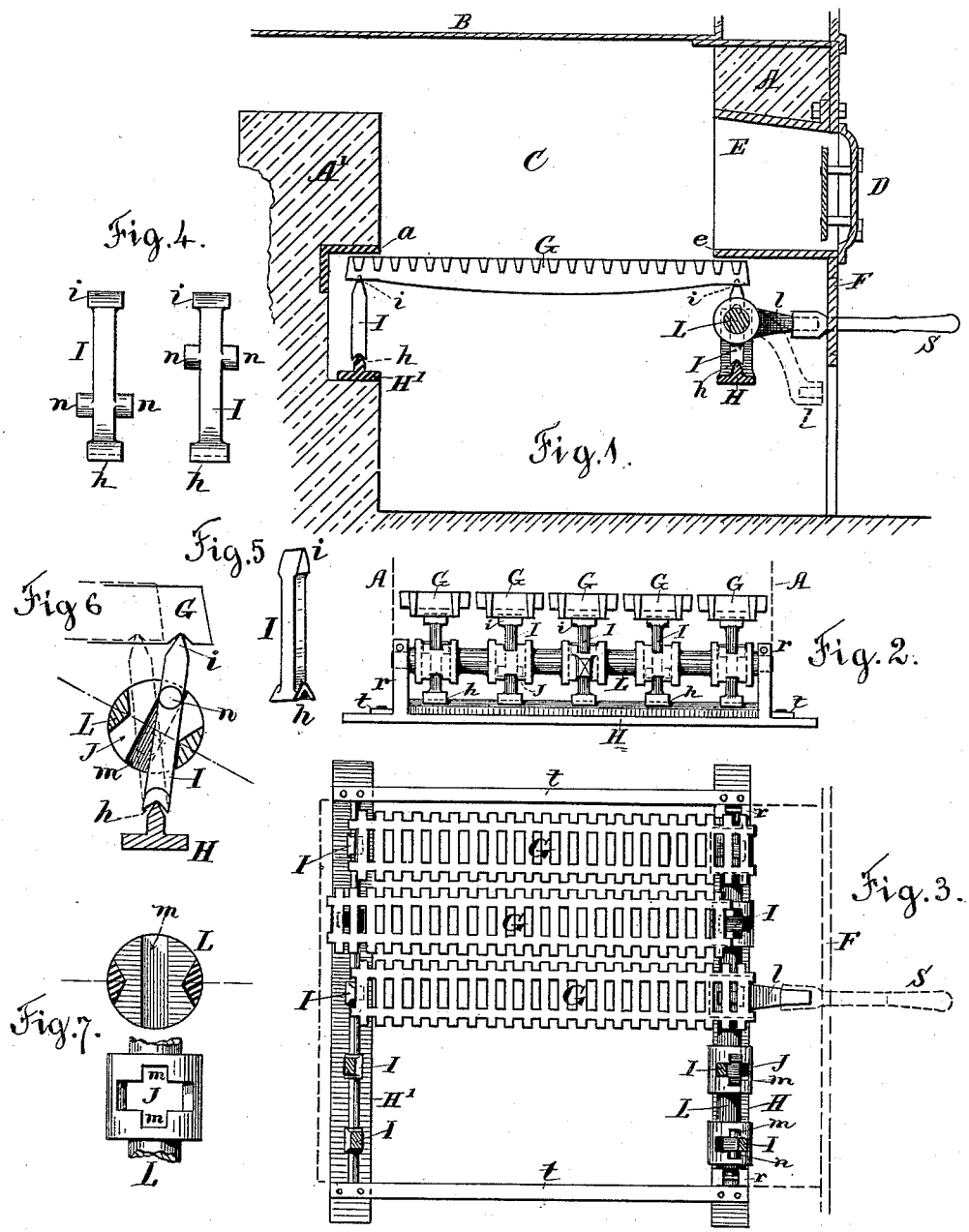
Witnesses.
O. R. Barton
Ella P. Plenus
Inventor.
George L. Allen
By Chas. H. Burleigh
Attorney.

UNITED STATES PATENT OFFICE.

GEORGE L. ALLEN, OF WORCESTER, MASSACHUSETTS.

FURNACE-GRATE.

SPECIFICATION forming part of Letters Patent No. 409,657, dated August 27, 1889.

Application filed November 19, 1888. Serial No. 291,216. (No model.)

*To all whom it may concern:*

Be it known that I, GEORGE L. ALLEN, a citizen of the United States, residing at Worcester, in the county of Worcester and State of Massachusetts, have invented certain new and useful Improvements in Furnace-Grates, of which the following, together with the accompanying drawings, is a specification sufficiently full, clear, and exact to enable persons skilled in the art to which this invention appertains to make and use the same.

The object of my present invention is to provide a grate for boiler-furnaces, more especially those employed for house-heating purposes, having its grate-bars constructed, supported, and arranged in the manner explained, so that the grates can be easily shaken, and in which the grate-bars will have a tendency to keep clear from clogging and choking with cinders and ashes, and which will afford an ample and unobstructed space beneath the grate-bars for the falling of the ashes from the fire; also, to provide, in combination with a series of grate-bars severally mounted upon rocking or tiltable stilt-bars, an operator or shaking mechanism that simultaneously imparts movement to the alternate bars in opposite directions to each other. These objects I attain by mechanism the nature, construction, and operation of which are hereinafter explained, the particular subject-matter claimed being definitely specified.

In the drawings, Figure 1 is a vertical section through a boiler-furnace, showing the arrangement of my improved grate therein. Fig. 2 is a front view of my grate. Fig. 3 is a plan view, a part being shown in horizontal section below the level of the grate-bars. Fig. 4 shows the form of the tilting stilts for supporting the front ends of the grate-bars. Fig. 5 shows the stilt-bar for the rear end of the grate-bars. Fig. 6 shows the detail of the operating mechanism for shaking the grate. Fig. 7 shows a section and plan view of a portion of the operating-shaft, illustrating the form of openings for engaging the tiltable stilt-bars.

In reference to parts, A denotes the furnace-wall, B the bottom of the boiler, C the fire-chamber, D the entrance-door, E the arch or mouth piece, and F the front plate, all of which may be of any suitable construction, or be disposed substantially as shown in Fig. 1.

G indicates the grate-bars, which are preferably disposed in a direction from front to rear of the chamber, with their forward ends reaching beneath the bottom $e$ of the mouth-piece E and their rear ends extended beneath a plate or bar $a$, that is laid into the bridge-wall A'. Carrier girts or bearers H and H' are properly supported on the walls and extend across the chamber transversely beneath the ends of the grate-bars. These carrier-girts support a series of tiltable standards or stilt-bars I, upon which the respective ends of the grate-bars G are independently sustained, the joints at the upper and lower ends of said tiltable stilt-bars, where they meet the grate-bars G and bearers H and H', being furnished with pointed or knife-edged bearings horizontally disposed on a line transverse to the length of the grate-bar.

The grate-bar is preferably made, as shown, with two longitudinal ribs or webs cast integral with a series of cross-bars having openings between them and extending beyond the longitudinal parts, so as to give rows of projections and depressions along the opposite edges, which, in conjunction with the adjacent grate-bars, serve to crush and break up the cinders and clinkers, so that they will fall through the spaces. At their ends each grate-bar is furnished with a transverse groove, recess, or depression on its under side, into which the knife-edged end $i$ of the stilt-bar I engages for retaining the grate-bar in proper relation thereto. In the present instance the carrier-girts H H' are furnished with a knife-edged rib or member along the top, and the stilt-bars I are made with a hollow or bird-mouth $h$ to rest thereon; but while this is deemed the preferable construction it is obvious that the construction might be reversed, if desired, the point or knife-edge being formed on the stilt-bar and the hollow formed in the carrier-girt, the result being an equivalent action.

L indicates an operator-shaft or bar journaled at its ends in suitable bearing-ears $r$ on the girt H, and provided with a suitable tongue or socket $l$ for connecting the shaker-handle S therewith. The stilt-bars I for the front of the grate pass through openings J in said shaft L, and are arranged for action as follows: Said openings J have upright grooves *m* at either side, (see Figs. 6 and 7,) while the stilt-bars I are provided with laterally-projecting lugs or circular bosses *n*, that engage with said grooves, as indicated. The series of stilt-bars I have their projections or lugs *n* disposed alternately at upper or lower positions, (see Fig. 4,) so that when placed in the grooves *m* the projections on one stilt-bar are above the axis of the operator-shaft L and those on the next stilt-bar are below the axis of said operator-shaft. Consequently, when the shaft L is rocked or oscillated on its longitudinal axis, the top ends of the stilt-bars I are tilted or swung backward and forward, those with the higher bosses being carried backward, while those with the lower bosses are carried forward, and vice versa. As the ends of the grate-bars rest independently upon the top ends of the stilt-bars I, said grate-bars of course receive corresponding movement; hence by moving the shaker-handle S up and down an alternating backward and forward sawing action of the grate-bars G is effected, each alternate grate-bar moving backward, while the others simultaneously move forward, and vice versa. When the grooves *m* are in vertical position, the stilt-bars I are all upright, and the grate-bars G then stand even with each other.

The tongue *l* of the operator-shaft L may project toward the front to be reached through a suitable opening in the front plate F, or it can be extended downward, as indicated in dotted lines, Fig. 1, to be reached through the doorway of the ash-pit; or, if in any instance preferred, the end of the shaft could be extended through the wall and the shaker-handle connected with its end.

If desired, the front and rear bearers H and H' may be connected with each other by the tie-bars *t*.

The plate *a* in the bridge-wall A' and the bottom *e* of the mouth-piece arch E serve as guards over the ends of the grate-bars for preventing pieces of coal from dropping past or blocking the ends of the grate-bars as they are shifted in the action of shaking the grate.

The space beneath the grate is entirely open and unobstructed, so that cinders and ashes can fall direct from the grate, and no liability is offered for their choking or interfering with the free and easy action of the mechanism.

I claim as my invention, to be secured by Letters Patent—

1. A furnace-grate composed of a series of grate-bars, each formed of two longitudinal webs with integral cross-pieces that project beyond the edges thereof, said grate-bars having recesses in the under side at their respective ends, a series of stilt-bars having bird-mouth notches at their bottom ends and wedge-shaped top ends that match into said recesses and independently support the respective ends of the grate-bars, the carrier-girts having a wedge-shaped rib on which said stilt-bars rest, and a rocker-shaft that engages with the stilt-bars at one end of the grate by intermatching lugs and recesses, said shaft being provided with means for effecting rocking action thereof, all substantially as set forth.

2. The combination, substantially as described, of the grate-bars, the carrier-girts, tiltable stilt-bars that independently sustain the respective ends of the grate-bars, the forward stilt-bars being furnished with laterally-projecting lugs alternately disposed above and below the central axis, the operator-shaft provided with a series of openings through which said forward stilt-bars extend, and having side grooves that engage said projecting lugs, and a tongue or socket on said shaft for the attachment of a shaker-handle, for the purpose set forth.

Witness my hand this 10th day of November, A. D. 1888.

GEO. L. ALLEN.

Witnesses:
 CHAS. H. BURLEIGH,
 ELLA P. BLENUS.